US012572688B2

(12) United States Patent
Zhu et al.

(10) Patent No.: US 12,572,688 B2
(45) Date of Patent: Mar. 10, 2026

(54) END-TO-END EFFICIENT PRIVACY-PRESERVING COMPUTATION APPARATUS AND METHOD FOR SECURE TWO-PARTY MATRIX INVERSION

(71) Applicant: Beihang University, Beijing (CN)

(72) Inventors: Haogang Zhu, Beijing (CN); Shizhao Peng, Beijing (CN); Jiarui Tu, Beijing (CN)

(73) Assignee: Beihang University, Beijing (CN)

( * ) Notice: Subject to any disclaimer, the term of this patent is extended or adjusted under 35 U.S.C. 154(b) by 175 days.

(21) Appl. No.: 18/388,145

(22) Filed: Nov. 8, 2023

(65) Prior Publication Data

US 2025/0005193 A1    Jan. 2, 2025

(30) Foreign Application Priority Data

Jun. 27, 2023    (CN) ......................... 202310768308.X

(51) Int. Cl.
| | |
|---|---|
| *G06F 17/16* | (2006.01) |
| *G06F 21/62* | (2013.01) |
| *H04L 67/02* | (2022.01) |
| *H04L 67/133* | (2022.01) |

(52) U.S. Cl.
CPC .......... *G06F 21/6245* (2013.01); *H04L 67/02* (2013.01); *H04L 67/133* (2022.05)

(58) Field of Classification Search
CPC .... G06F 21/6245; H04L 67/133; H04L 67/02
USPC ..................................... 726/22–25
See application file for complete search history.

(56) References Cited

U.S. PATENT DOCUMENTS

| | | | | |
|---|---|---|---|---|
| 8,954,737 | B2 * | 2/2015 | DeCristofaro ...... | G06F 21/6245 |
| | | | | 709/224 |
| 10,296,709 | B2 * | 5/2019 | Laine .................. | G06F 21/6245 |
| 11,900,169 | B1 * | 2/2024 | Dhandhania ........ | G06F 16/9024 |
| 12,231,151 | B1 * | 2/2025 | Galvin ............... | H03M 7/6005 |
| 12,339,904 | B2 * | 6/2025 | Hunter ................. | H04L 67/133 |
| 2011/0060901 | A1 * | 3/2011 | Troncoso Pastoriza ..................... | |
| | | | | H04L 9/008 |
| | | | | 713/150 |
| 2022/0092216 | A1 * | 3/2022 | Mohassel ............ | G06F 21/6245 |
| 2022/0366005 | A1 * | 11/2022 | Nowicki ................. | G06F 17/16 |
| 2023/0237321 | A1 * | 7/2023 | Cirillo ................. | G06F 21/6245 |
| | | | | 706/15 |
| 2023/0269093 | A1 * | 8/2023 | Ben-Ari .............. | G06F 21/6245 |
| | | | | 713/175 |

(Continued)

*Primary Examiner* — Bharat Barot

(57) ABSTRACT

The present disclosure provides an end-to-end efficient privacy-preserving computation apparatus and method for secure two-party matrix inversion, relating to the technical field of privacy-preserving computation. In the present disclosure, the respective corresponding output matrices are determined using the privacy-preserving computation request and the private data matrices and then sent to the requesting party of the secure two-party inversion computation, so that the requesting party obtains the final inversion computation result. This solves the problems of large computation and communication overhead in ciphertext space caused by the introduction of homomorphic encryption and oblivious transfer techniques in the prior art, as well as privacy and security issues caused by the leakage of original data and the loss of precision in floating-point number calculation due to the limitation of fixed-length digits in ciphertext computation.

11 Claims, 7 Drawing Sheets

(56) References Cited

U.S. PATENT DOCUMENTS

| | | | |
|---|---|---|---|
| 2024/0394407 A1* | 11/2024 | Choudhary | G06F 21/6254 |
| 2025/0182123 A1* | 6/2025 | Das | G06F 21/6245 |

* cited by examiner

END-TO-END EFFICIENT PRIVACY-PRESERVING COMPUTATION APPARATUS AND METHOD FOR SECURE TWO-PARTY MATRIX INVERSION

CROSS REFERENCE TO RELATED APPLICATION

This patent application claims the benefit and priority of Chinese Patent Application No. 202310768308X, filed with the China National Intellectual Property Administration on Jun. 27, 2023, the disclosure of which is incorporated by reference herein in its entirety as part of the present application.

TECHNICAL FIELD

The present disclosure relates to the technical field of privacy-preserving computation, and in particular to an end-to-end efficient privacy-preserving computation apparatus and method for secure two-party matrix inversion.

BACKGROUND

With the innovation and application of artificial intelligence and big data technologies, the world has officially entered the "data-driven" era, and data has become an important strategic resource for countries and enterprises. However, in the era of big data, it is necessary to achieve opening and sharing of data, and how to realize "availability but invisibility" of the data, to solve a problem of a data island to realize the interconnection and fusion analysis of the data becomes an urgent problem to be solved. A privacy-preserving computation technology not only realizes secure circulation of the data but also effectively ensures separation of data ownership and data use right on the premise that original data privacy is effectively guaranteed not to be disclosed.

The privacy-preserving computation technology is widely used in application scenarios such as joint mining of big data, and joint modeling of machine learning, which involve matrix inversion computation. For example, in a two-party secure linear regression problem, two participants each hold a portion of private data A and private data B, which together form an original dataset X=[A:B] and undisclosed privacy data related to label Y. The goal is to jointly solve for the regression coefficient $\beta=(X^T X)^{-1}(X^T Y)$ of the model without revealing any private information. This involves two-party secure matrix inversion computation. Y represents label information of linear regression, i.e., the true value.

There are various existing methods for two-party secure matrix inversion computation. For example, a multi-server verifiable matrix inversion outsourcing scheme is based on homomorphic encryption. The computational complexity for the user is $O(n^2 t^2)$, where n is the order of the matrix, and t is the threshold. While Benjamin and Atallah's computation scheme effectively protects the privacy of input data and ensures verifiability of the computation, it suffers from decreased computational efficiency due to the introduction of homomorphic encryption. Additionally, there is a risk of privacy leakage since a third-party cloud service provider involved in the outsourcing is vulnerable malicious attacks.

An efficient and verifiable blind technique for matrix inversion and matrix multiplication can be based on random permutation of sparse matrices and Monte-Carlo verification algorithm. The core idea is to encrypt an original large-scale matrix by multiplication with a specially designed sparse matrix, and then perform computation and decrypt resulting ciphertext on the cloud. While this approach improves the efficiency of outsourcing computations on the cloud, it relies on the invertibility of the blind matrix inversion. This introduces the potential security risk of information leakage for local zero-element data in the original matrix and loss of precision for inversion computation of ill-conditioned data matrices.

A publicly verifiable shared computation model for higher-order polynomial and matrix inversion can be based on different cryptographic hardness assumptions (such as co-CDH hardness assumption and decisional linear hardness assumption) and secret sharing techniques. While this approach improves the overall computational security, it introduces a significant increase in computational overhead due to the involvement of numerous public-key cryptographic tools. Additionally, the secret sharing scheme is related to a finite field, which leads to loss of precision in the computation.

A secure two-party matrix inversion protocol can be used for solving n-order matrix equation systems by utilizing $OT_1{}^n$ oblivious transfer protocols. Zhen et al.'s approach, based on $OT_1{}^n$ oblivious transfer, involves a significant number of communication rounds. As a result, it suffers from high communication costs and low computational efficiency when dealing with large-scale data matrix inversion tasks.

Based on the above description, there have been the following problems in the prior art:

1. The introduction of homomorphic encryption and oblivious transfer technologies leads to large ciphertext space computation and communication overhead.
2. When malicious attacks cause data leakage, the disclosure of raw data leads to the privacy and security issues.
3. The limitation of fixed-length digits in ciphertext computation results in the loss of numerical precision in floating-point number calculations.

SUMMARY

In order to solve the foregoing problem in the prior art, the present disclosure provides an end-to-end efficient privacy-preserving computation apparatus and method for secure two-party matrix inversion.

To achieve the above objective, the present disclosure provides the following technical solutions.

An end-to-end efficient privacy-preserving computation apparatus for secure two-party matrix inversion includes: a client, a first participant node, and a second participant node.

The first participant node and the second participant node are both connected to the client. The first participant node and the second participant node contain private data matrices.

The client is configured to generate a privacy-preserving computation request. The first participant node and the second participant node are configured to determine corresponding output matrices based on the privacy-preserving computation request and the respective private data matrices. The client obtains an inversion computation result based on the output matrices determined by the first participant node and the second participant node.

Optionally; both the first participant node and the second participant node are deployed with a distributed computing architecture.

Optionally, the distributed computing architecture includes a task acquisition module, a secure computation module, a rule generation module, a consensus computation module, and a data transmission module.

The task acquisition module is connected to both the client and the secure computation module. The secure computation module is connected to the rule generation module. The rule generation module is connected to the consensus computation module. The data transmission module is connected to both the consensus computation module and the client.

The task acquisition module is configured to acquire and parse the privacy-preserving computation request generated by the client. The secure computation module is configured to automatically match a secure computation protocol according to the parsed privacy-preserving computation request from the task acquisition module and synchronize the matched secure computation protocol to the rule generation module. The rule generation module is configured to formulate different asynchronous parallel execution processes according to different subtasks assigned to the first participant node and the second participant node, and communicate with the consensus computation module during execution of each computation instruction in the asynchronous parallel execution process. The consensus computation module is configured to ensure synchronization and result consistency of execution of each computation instruction based on a consensus protocol while the first participant node and the second participant node execute each computation instruction. Once output matrices of the first participant node and the second participant node are obtained after the entire asynchronous parallel execution process is completed, the data transmission module is configured to send the respective output matrices of the first participant node and the second participant node to the client.

Optionally, the client is configured to send the privacy-preserving computation request to the first participant node and the second participant node by using a Hypertext Transfer Protocol (HTTP) communication protocol or a gRPC (which is a cross-platform open source high performance remote procedure call (RPC) framework) communication protocol.

An end-to-end efficient privacy-preserving computation method for secure two-party matrix inversion is applied to the foregoing privacy-preserving computation apparatus. The privacy-preserving computation method includes:

generating a first random matrix pair and a second random matrix pair:

determining a first matrix based on the first random matrix pair and a private data matrix of the first participant node, where the first matrix is determined by the first participant node:

determining a second matrix based on the second random matrix pair and a private data matrix of the second participant node, where the second matrix is determined by the second participant node:

generating a random matrix and determining a second local matrix based on the random matrix, the first matrix, the private data matrix of the second participant node, and the second random matrix pair, where the second local matrix is determined by the second participant node:

determining a first local matrix based on the second local matrix, the first random matrix pair, and the second matrix, where the first local matrix is determined by the first participant node: and determining an inversion computation result based on the random matrix and the first local matrix, where the inversion computation result is determined by the client.

Optionally, the first matrix is:

$$\hat{A} = A + R_a;$$

where $\hat{A}$ is the first matrix, A. is the private data matrix of the first participant node, and $R_a$ is one random matrix in the first random matrix pair. Optionally, the second matrix is:

$$\hat{B} = B + R_b;$$

where $\hat{B}$ is the second matrix, B is the private data matrix of the second participant node, and $R_b$ is one random matrix in the second random matrix pair.

Optionally, the second local matrix is:

$$T = \hat{A} \cdot B + (r_b - V_b);$$

where T is the second local matrix, $\hat{A}$ is the first matrix, B is the private data matrix of the second participant node, $r_b$ the other random matrix in the second random matrix pair, and $V_b$ is the random matrix.

Optionally, the first local matrix is:

$$V_a = T + r_a - (R_a \cdot \hat{B});$$

where $V_a$ is the first local matrix, $R_a$ is one random matrix in the first random matrix pair, $\hat{B}$ is the second matrix, T is the second local matrix, and $r_a$ is the other random matrix in the first random matrix pair.

Optionally, the inversion computation result is:

$$AB = V_a + V_b;$$

where A· is the private data matrix of the first participant node, B is the private data matrix of the second participant node, $V_b$ is the random matrix, and $V_a$ is the first local matrix.

According to specific embodiments provided in the present disclosure, the present disclosure has the following technical effects. In the present disclosure, the respective corresponding output matrices are determined using the privacy-preserving computation request and the private data matrices and then sent to the requesting party of the secure two-party inversion computation, so that the requesting party obtains the final inversion computation result. This solves the problems of large computation and communication overhead in ciphertext space caused by the introduction of homomorphic encryption and oblivious transfer techniques in the prior art, as well as the privacy and security issues caused by the leakage of original data and the loss of precision in floating-point number calculation due to the limitation of fixed-length digits in ciphertext computation in the prior art.

BRIEF DESCRIPTION OF THE DRAWINGS

To describe the technical solutions in embodiments of the present disclosure or in the prior art more clearly, the accompanying drawings required for the embodiments are briefly described below. Apparently; the accompanying drawings in the following description show merely some embodiments of the present disclosure, and those of ordinary skill in the art may still derive other accompanying drawings from these accompanying drawings without creative efforts.

DETAILED DESCRIPTION OF THE EMBODIMENTS

The technical solutions of the embodiments of the present disclosure are clearly and completely described below with reference to the drawings in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

Term explanation:

Semi-Honest Adversaries Security: It is a specific protocol that assumes all participants will honestly engage in privacy-preserving computation. The protocol is strictly followed in execution of each step. However, there are some corrupted participants who attempt to infer the privacy of other participants through the intermediate or final results of the protocol execution. posing a risk to the privacy of other participants.

Privacy-Preserving Computation: It refers to a set of information technologies that allow for the analysis and computation of data while ensuring that the data provider does not disclose the original data, to ensure that data remains "available but invisible" during circulation and integration processes.

An objective of the present disclosure is to provide an end-to-end efficient privacy-preserving computation apparatus and method for secure two-party matrix inversion, which can solve the problems of large computation and communication overhead in ciphertext space caused by the introduction of homomorphic encryption and oblivious transfer techniques in the prior art. as well as the privacy and security issues caused by the leakage of original data and the loss of precision in floating-point number calculation due to the limitation of fixed-length digits in ciphertext computation in the prior art.

In order to make the above objective, features and advantages of the present disclosure clearer and more comprehensible, the present disclosure will be further described in detail below in combination with accompanying drawings and particular implementation modes.

Figure 1:
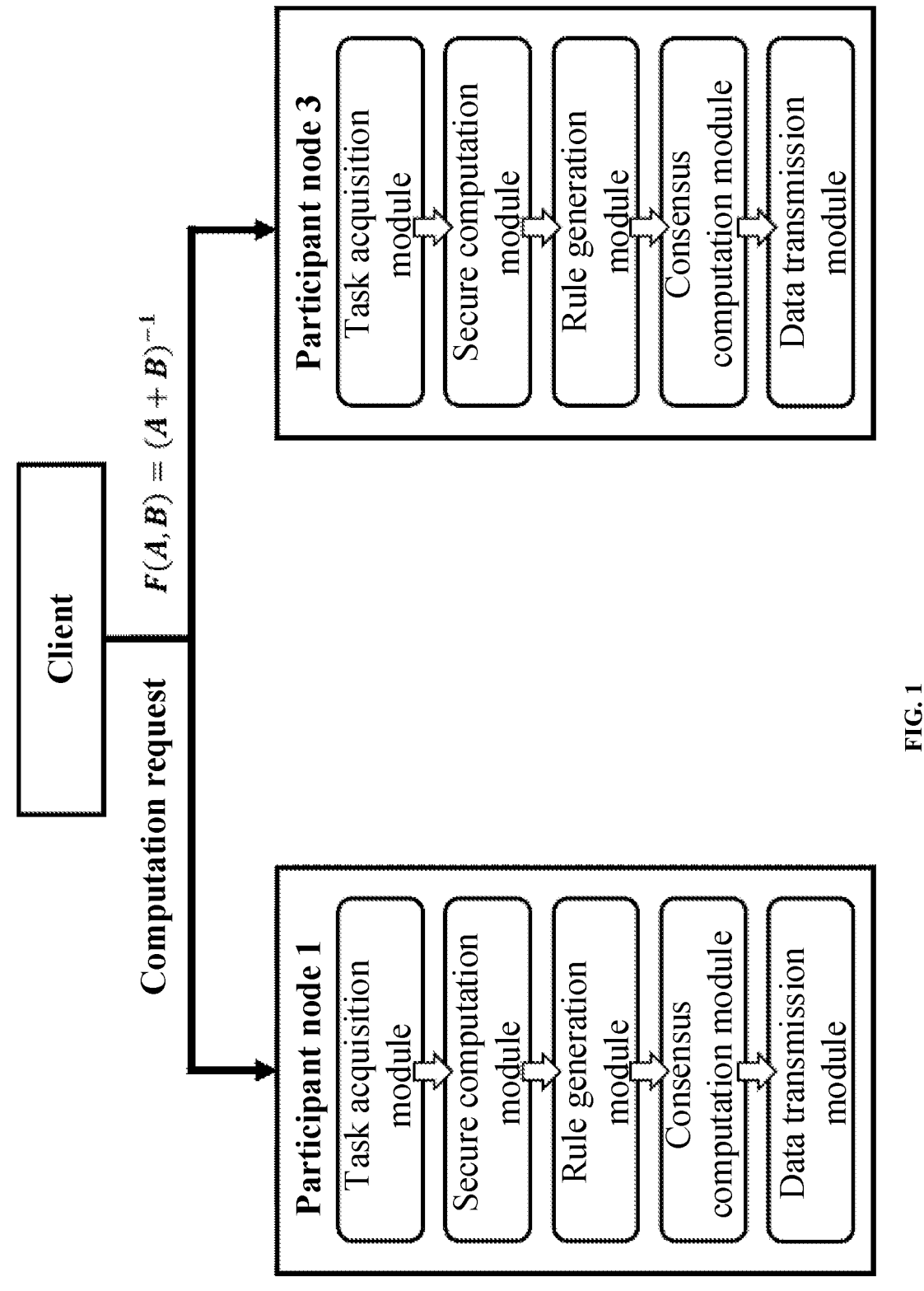
FIG. 1 is a schematic diagram of implementation of an end-to-end efficient privacy-preserving computation apparatus for secure two-party matrix inversion according to an embodiment of the present disclosure.
Figures 2, 3:
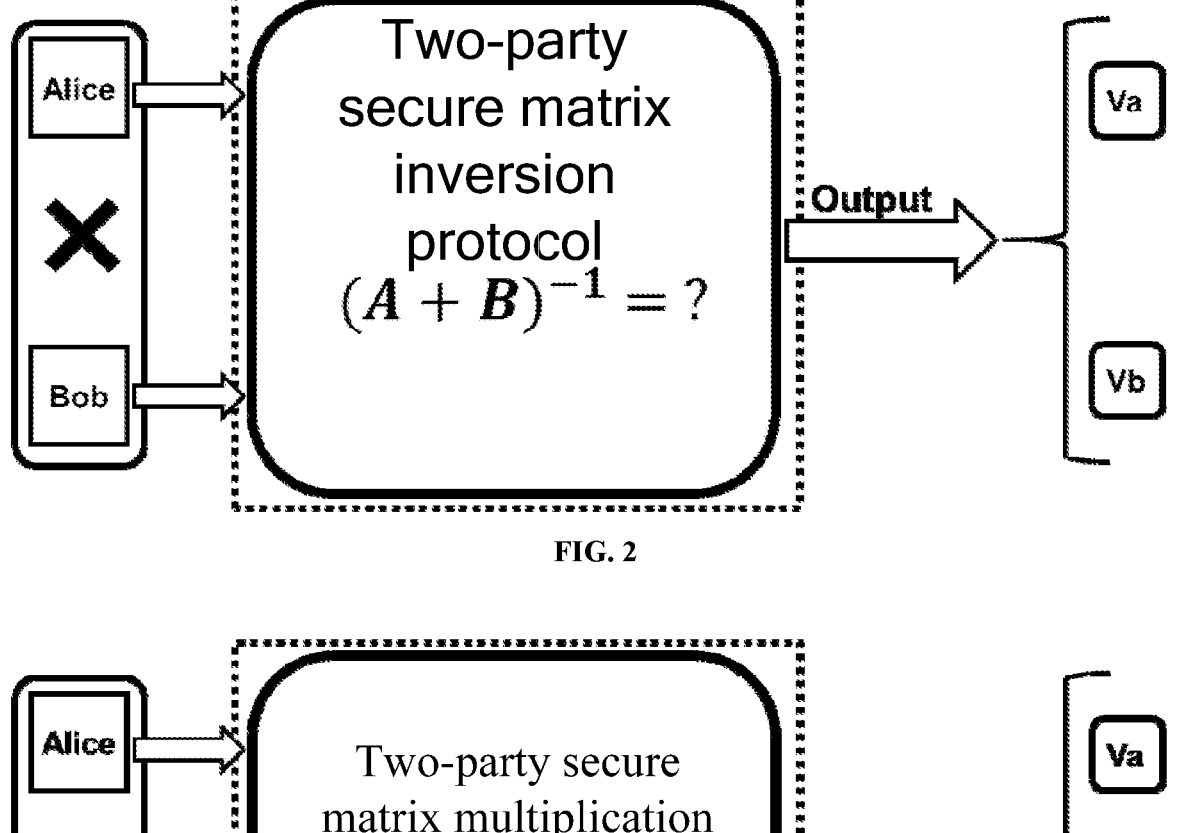
FIG. 2 is a schematic diagram of a secure two-party matrix inversion computation problem according to an embodiment of the present disclosure.
FIG. 3 is a schematic diagram of a secure two-party matrix multiplication problem according to the present disclosure.

As shown in FIG. 1, the end-to-end efficient privacy-preserving computation apparatus for secure two-party matrix inversion provided by the present disclosure includes: a client, a first participant node (i.e., participant node 1 in FIG. 1), and a second participant node (i.e., participant node 1 in FIG. 2).

The first participant node and the second participant node are both connected to the client. The first participant node and the second participant node contain private data matrices.

The client is configured to generate a privacy-preserving computation request. The first participant node and the second participant node are configured to determine corresponding output matrices based on the privacy-preserving computation request and the respective private data matrices. The client obtains an inversion computation result based on the output matrices determined by the first participant node and the second participant node.

Further, a corresponding distributed computing framework is deployed on the computation participant nodes (i.e., the first participant node and the second participant node) of the secure two-party matrix inversion computation task. The framework consists of five modules, including a task acquisition module, a secure computation module, a rule generation module, a consensus computation module, and a data transmission module.

In the actual application process. the task acquisition module is responsible for receiving and decoding a privacy-preserving computation request from the client. The secure computation module automatically matches a corresponding two-party secure computation protocol according to the parsed privacy-preserving computation request. The rule generation module implements task decomposition according to an asynchronous instruction set of the secure computation protocol. Different participant nodes execute collaborative computation according to their respective rules. The consensus computation module ensures the synchronicity and result consistency of the computation by using a consensus protocol after receiving the assigned sub-rules. After the computation is completed. the data transmission module collects computation results (i.e., output matrices) from each participant node. and transmits the computation results to the computation requesting party (i.e., the client).

Based on the description above. the specific implementation principle of the privacy-preserving computation apparatus provided by the present disclosure is as follows:

The client sends. through the HTTP or gRPC communication protocol. a request for two-party matrix inversion computation (i.e., privacy-preserving computation request) to a network end that is deployed with a distributed computing framework. Upon receiving the request for matrix inversion computation. the task acquisition modules of the participant nodes on the network parse the request and initiate secure computation service processes of the first participant node and the second participant node. After completing the parsing of the corresponding computation request. the task acquisition module sends the parsed request to the secure computation module. which performs a joint query through an internal interface. Once a matching secure computation protocol is found. it is synchronized to the rule generation module in the two participant nodes. The rule generation module formulates different asynchronous parallel execution processes according to different sub-tasks assigned to the two participant nodes, and maintains communication with the consensus computation module at each step of the asynchronous parallel execution processes. During execution of each calculation instruction on the two participant nodes. the consensus computation module broadcasts and maintains the result consistency of the distributed computing nodes on the chain, and controls the stability of the execution process. Once the computation protocol is completed finally. and the two participant nodes obtain sub-results (i.e., output matrices) of the computation from each other. the data transmission module sends the sub-results to the requesting party. Through a two-party obfuscation. a correct computation result (i.e., an inverse calculation result) is obtained.

Furthermore, the Secure Two-Party Matrix Inversion Protocol (2PIP) is defined as follows: assuming there are two mutually distrusting participants, P1 and P2, the participants hold secret input matrices, x and y, respectively, and jointly execute a two-party multiplication protocol $f(x,y)=(v_1,v_2)=(x+y)^{-1}$. Eventually, each participant obtains a corresponding output $v_1$, $v_2$, where the output satisfies $v_1+v_2=(x+y)^{-1}$. Throughout the entire computation process, each participant node only has knowledge of the input and output data involved in its own computation flow and cannot access any intermediate computation results of the other participant node. Based on this, the problem of secure two-party matrix inversion computation is defined as follows in the present disclosure:

Given the presence of two participant nodes Alice and Bob, which are independent and mutually distrusting, the participant node Alice holds a private data matrix $A \in R^{n \times n}$ that is only stored in its own computing node. The participant node Bob holds a private data matrix $B \in R^{n \times n}$ The two participant nodes jointly execute a secure matrix multiplication protocol to achieve the computation of the two-party matrix inversion protocol $f(A, B)=(A+B)^{-1}=V_a+V_b$. Eventually; each participant node obtains its corresponding output matrix $V_a$, $V_b \in R^{n \times n}$ and sends the output matrix to the computation requesting party, who aggregates the output matrices to obtain an expected result of the two-party matrix inversion computation. During the computation process, each participant node can only obtain input/output information related to its own computation process, and cannot access intermediate computation results and private data information of the other participant node, as shown in FIG. 2.

The Secure Two-Party Matrix Multiplication Protocol (2PMP) is defined as follows: Assuming there are two mutually distrusting participants, P1 and P2, the two participant hold secret input matrices, x and y, respectively, and jointly execute a two-party multiplication protocol $f(x,y)=(v_1, V_2)=x \cdot y$. Eventually, each participant obtains a corresponding output $v_1$, $v_2$. where the output satisfies $v_1+v_2=x \cdot y$. Throughout the entire computation process, each participant node only has knowledge of the input and output data involved in its own computation flow and cannot access any intermediate computation results of the other participant node. Based on this, the Secure Two-Party Matrix Multiplication Protocol is defined as follows in the present disclosure:

Given the presence of two participant nodes, Alice and Bob, which are independent and mutually distrusting, the participant node Alice holds an nxs-dimensional private data matrix A that is only stored in its own computing node. The participant node Bob holds an sxm--dimensional private data matrix B. The two participant nodes expect to achieve $f(A, B)=AB=V_a+V_b$ by jointly executing a secure matrix multiplication protocol. Eventually, each participant node obtains its corresponding nxm-dimensional output matrix $V_a$, $V_b$ and sends the output matrix to the computation requesting party, who aggregates the output matrices to obtain an expected result of the two-party matrix multiplication. During the computation process, each participant node can only obtain its own input/output information, and cannot access intermediate computation results and private data information of the other participant, specifically as shown in FIG. 3.

Based on this, the present disclosure provides an end-to-end efficient privacy-preserving computation method for secure two-party matrix inversion, which is applied to the foregoing privacy-preserving computation apparatus. The privacy-preserving computation includes the following steps:

Step 1: Generate a first random matrix pair and a second random matrix pair. For example, an auxiliary computing node, also referred to as a commodity server (CS), generates two random matrix pairs, which are an nxs-dimensional random matrix, an sxm-dimensional random matrix, and two nxm-dimensional random matrices $r_a$, $r_b$ The following constraint $r_a+r_b=R_a \cdot R_b$ needs to be strictly met among these random matrices. Then, the CS sends the first random matrix pair ($R_a$, $r_a$) to the participant node Alice (i.e., the first participant node) and sends the second random matrix pair ($R_a$, $r_b$) to the participant node Bob (i.e., the second participant node).

Step 2: Determine a first matrix based on the first random matrix pair and a private data matrix of the first participant node. The first matrix is determined by the first participant node.

In the actual application process, after receiving the corresponding random matrix pair ($R_a$, $r_a$), the participant node Alice internally calculates the first matrix as $\hat{A}=A+R_a$, and sends the calculated first matrix to the participant node Bob.

Step 3: Determine the second matrix based on the second random matrix pair and a private data matrix of the second participant node. The second matrix is determined by the second participant node.

In the actual application process, after receiving the corresponding random matrix pair ($R_o$, $r_b$), the participant node Bob internally calculates the second matrix as: $\hat{B}=B+R_b$, and sends the second matrix to the participant node Alice.

Step 4: Generate a random matrix and determine a second local matrix based on the random matrix, the first matrix, the private data matrix of the second participant node, and the second random matrix pair. The second local matrix is determined by the second participant node.

In the actual application process, after receiving the first matrix sent by the participant node Alice, the participant node Bob internally generates a random matrix $V_b \in R^{n \times m}$ in secret and performs local computation in secret to obtain a matrix, which is referred to as the second local matrix $T=\hat{A} \cdot B+(r_b-V_b)$ The local matrix is sent to the participant node Alice.

Step 5: Determine a first local matrix based on the second local matrix, the first random matrix pair, and the second matrix. The first local matrix is determined by the first participant node. That is, after receiving the second local matrix, the participant node Alice performs local secret calculation to obtain a matrix $V_a=T+r_a-(R_a \cdot \hat{B})$ to serve as the first local matrix.

Step 6: Determine an inversion computation result based on the random matrix and the first local matrix. The inversion computation result is determined by the client. For example, the participant nodes Alice and Bob send their respective final obfuscated split results (i.e., the local matrices) $V_a$ and $V_b$ to the party requesting two-party matrix multiplication. The requesting party then aggregates the results to obtain a final product, which is $AB=V_a+V_b$.

It can be readily verified that $$V_a + V_b = \left[ \left( \hat{A} \cdot B + (r_b - V_b) \right) + r_a - \left( R_a \cdot \hat{B} \right) \right] +$$

$$V_b = \left[ (A \cdot B - V_b) + (r_a + r_b - R_a \cdot R_b) \right] + V_b = A \cdot B.$$

Further, the secure two-party matrix inversion computation is essentially a composite operation on matrices of two parties. Since the intermediate computation process involves a plurality of secure two-party matrix multiplication computations, it is necessary to introduce the computation method involved in the secure two-party matrix multiplication protocol mentioned above into the secure two-party matrix inversion computation method, in order to protect the privacy of the computation. The core idea of the computation method involved in the secure two-party matrix multiplication protocol is to introduce two random private invertible matrices, P and Q, to transform the problem of secure two-party matrix inversion into a hybrid operation problem of secure two-party matrix multiplication. Therefore, based on the ownership of the random invertible matrices P and Q, this method can be divided into two categories: secure two-party matrix inversion scheme where the random invertible matrices P and Q belong to the same party, and secure two-party matrix inversion scheme where the random invertible matrices P and Q belong to different parties.

Based on the above, the present disclosure provides the following embodiments to illustrate the specific implementation process of the foregoing end-to-end efficient privacy-preserving computation apparatus and method for secure two-party matrix inversion provided by the present disclosure.

Embodiment 1

Figure 4:
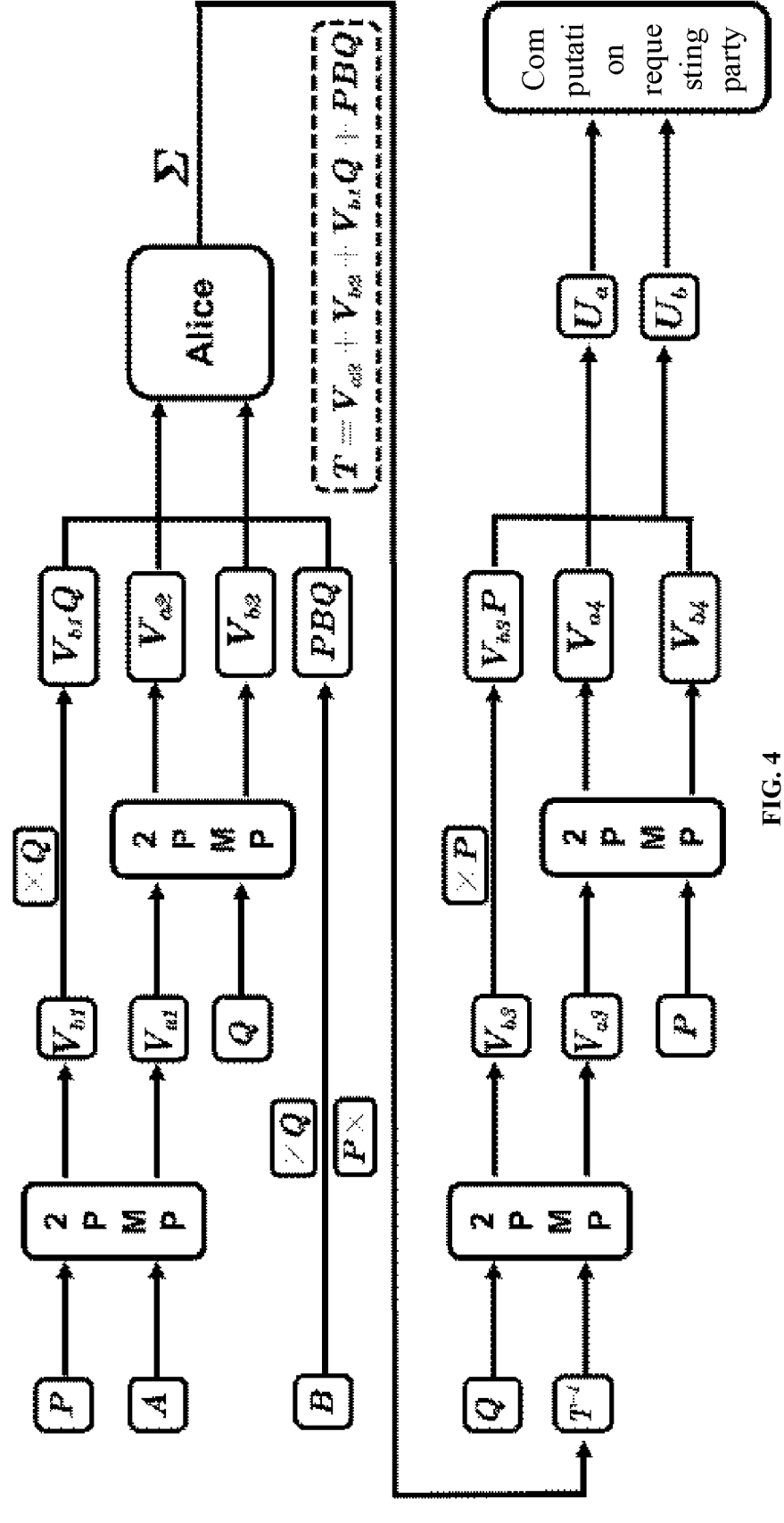
FIG. 4 is a schematic flowchart of a secure two-party matrix inversion computation method based on a Secure Two-Party Matrix Multiplication Protocol (2PMP) according to Embodiment 1 of the present disclosure.

Private invertible matrices P, Q∈$R^{n \times n}$ belong to the same participant node. Without loss of generality, the private matrices P and Q belonging to the participant node Bob is taken as an example for description herein. It is known that the participant node Alice holds a private matrix A∈$R^{n \times n}$, and the participant node Bob holds a private matrix B∈$R^{n \times n}$. Accordingly, as shown in FIG. 4, the computation process of the secure two-party matrix inversion based on the 2PMP protocol is as follows:

Step 1: The participant node Bob locally generates two random invertible matrices P, Q∈$R^{n \times n}$ in secret.

Step 2: The participant node Alice and the participant node Bob input their respective private matrix A and private matrix P based on the 2PMP protocol, to perform the first round of secure two-party matrix multiplication. After execution of the 2PMP protocol is completed, the computation result will be randomly split into matrices $V_{a1}$, $V_{b1}$∈$R^{n \times n}$ according to the random obfuscation technique, which are sent to the participant node Alice and the participant node Bob respectively. Moreover, the two private output matrices satisfy $V_{a1}+V_{b1}=P \times A$.

Step 3: The participant node Alice and the participant node Bob jointly perform the second round of secure two-party matrix multiplication, where an input from the participant node Alice is the private data matrix $V_{a1}$ returned in Step 2, and an input from the participant node Bob is the private data matrix Q. After execution of the 2PMP protocol is completed, the computation result will be randomly split into two private matrices $V_{a2}$, $V_{b2}$ E $R^{n \times n}$, which are sent to the participant node Alice and the participant node Bob respectively. Moreover, the two private matrices satisfy $V_{a2}+V_{b2}=V_{a1} \times Q$.

Step 4: The participant node Bob performs local computation in secret to obtain a matrix $V_b=V_{b1} \times Q+V_{b2}+P \times B \times Q$, and then sends the private matrix $V_b$∈$R^{n \times n}$ to the participant node Alice.

Step 5: The participant node Alice performs local computation in secret to obtain a matrix $T=V_{a2}+V_b=V_{a2}+(V_{b2}+V_{b1} \times Q+P \times B \times Q)=P(A+B)Q$, where the matrix $T$∈$R^{n \times n}$.

Step 6: The participant node Alice further locally calculates an inverse matrix $T^{-1}=Q^{-1}(A+B)^{-1}P^{-1}$ of the matrix T in secret, where the matrix $T^{-1}$∈$R^{n \times n}$.

Step 7: The participant node Alice and the participant node Bob jointly perform the third round of secure two-party matrix multiplication, where the participant node Alice inputs the matrix $T^{-1}$ based on the 2PMP protocol, and the participant node Bob inputs the matrix Q based on the 2PMP protocol. After execution of the 2PMP protocol is completed, the computation result will be randomly split into two private matrices $V_{a3}$, $V_{b3}$∈$R^{n \times n}$, which are sent to the participant node Alice and the participant node Bob respectively. Moreover, the two private matrices satisfy $V_{a3}+V_{b3}=Q \times T^{-1}$.

Step 8: The participant node Alice and the participant node Bob jointly perform the fourth round of secure two-party matrix multiplication, where an input from the participant node Alice is the private data matrix $V_{a3}$ returned in Step 7, and an input from the participant node Bob is the private data matrix P. After execution of the 2PMP protocol is completed, the computation result will be randomly split into two private matrices $V_{a4}$, $V_{b4}$∈$R^{n \times n}$, which are sent to the participant node Alice and the participant node Bob respectively. Moreover, the two private matrices satisfy $V_{a4}+V_{b4}=V_{a3} \times P$.

Step 9: The participant node Alice locally stores the private matrix $V_{a4}$ returned in Step 8 as $U_a$, and the participant node Bob performs secret computation locally to obtain a matrix $U_b=V_{b3} \times P+V_{b4}$.

Step 10: The participant node Alice and the participant node Bob send their final obfuscated private result matrices $U_a$ and $U_b$ to a party requesting the secure two-party inversion computation (i.e., the client), and the client then aggregates the matrices to obtain a final inversion result: $(A+B)^{-1}=U_a+U_b$. Based on this, it can be readily verified that:

$$U_a + U_b = V_{b3} \times P + (V_{b4} + V_{a4}) = V_{a3} \times P + V_{b3} \times P =$$

$$(V_{a3} + V_{b3}) \times P = Q \times T^{-1} \times P = Q \times Q^{-1}(A+B)^{-1}P^{-1} \times P = (A+B)^{-1}.$$

Embodiment 2

Private invertible matrices P, Q∈$R^{n \times n}$ belong to different participant nodes. Without loss of generality, the private matrix P belonging to the participant node Alice and the private matrix Q belonging to the participant node Bob is taken as an example for description herein. It is known that the participant node Alice holds a private matrix $A \in R^{n \times n}$, and the participant node Bob holds a private matrix $B \in R^{n \times n}$.

Figure 5:
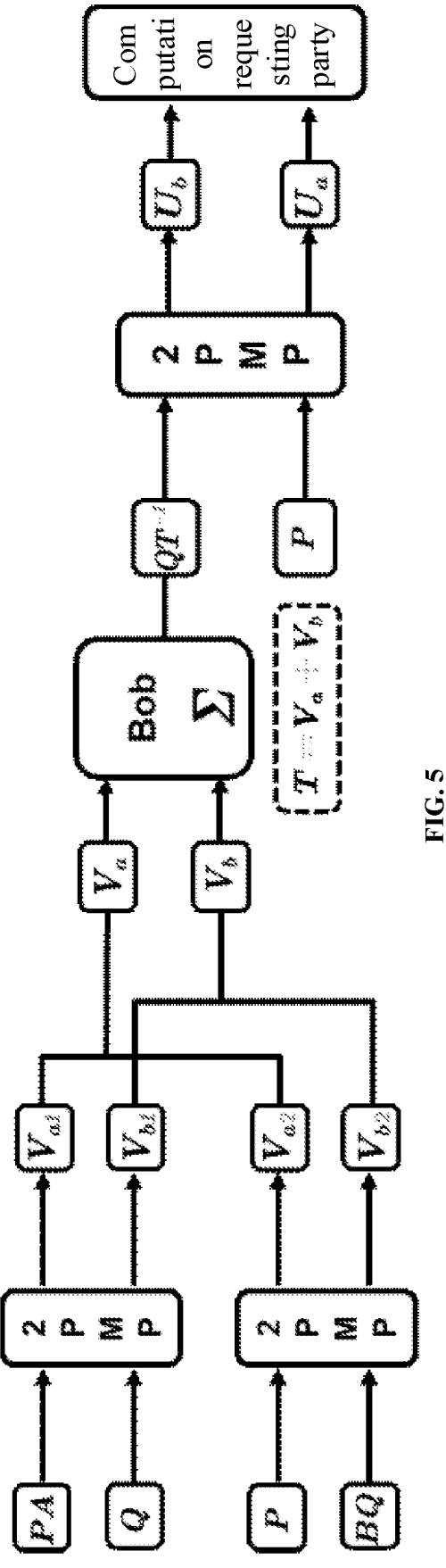
FIG. 5 is a schematic flowchart of a secure two-party matrix inversion computation method based on a 2PMP according to Embodiment 2 of the present disclosure.

Accordingly, as shown in FIG. 5, the computation process of the secure two-party matrix inversion based on the 2PMP protocol is as follows:

Step 1: The participant node Alice locally generates a random invertible matrix $P \in R^{n \times n}$ in secret, and performs local computation in secret to obtain a matrix $I_A = P \times A$.

Step 2: The participant node Bob locally generates a random invertible matrix $Q \in R^{n \times n}$ in secret, and performs local computation in secret to obtain a matrix $I_B = B \times Q$.

Step 3: The participant node Alice and the participant node Bob input their respective private matrix $I_A$ and private matrix Q based on the secure two-party matrix multiplication protocol 2PMP, to perform the first round of secure two-party matrix multiplication. After execution of the 2PMP protocol is completed, the computation result will be randomly split into matrices $V_{a1}, V_{b1} \in R^{n \times n}$ according to the random obfuscation technique, which are sent to the participant node Alice and the participant node Bob respectively. Moreover, the two private output matrices satisfy $V_{a1} + V_{b1} = (PA) \times Q$.

Step 4: The participant node Alice and the participant node Bob input their respective private matrix P and private matrix $I_B$* based on the secure two-party matrix multiplication protocol 2PMP, to perform the second round of secure two-party matrix multiplication. After execution of the 2PMP protocol is completed, the computation result will be randomly split into matrices $V_{a2}, V_{b2} \in R^{n \times n}$ according to the random obfuscation technique, which are sent to the participant node Alice and the participant node Bob respectively. Moreover, the two private output matrices satisfy $V_{a2} + V_{b2} = P \times (BQ)$.

Step 5: The participant node Alice performs local computation in secret to obtain a matrix $V_a = V_{a1} + V_{a2}$, and sends the private matrix $V_a \in R^{n \times n}$ to the participant node Bob.

Step 6: The participant node Bob performs local computation in secret to obtain a matrix $V_b = V_{b1} + V_{b2}$, aggregates the local matrix with the private matrix received from the participant node Alice to obtain $T = V_a + V_b$, then performs inversion in secret to obtain a matrix $T^{-1} = Q^{-1}(V_a + V_b)^{-1} P^{-1}$, where $T^{-1} \in R^{n \times n}$, and further performs computation to obtain a private matrix $I_B$* $= QT^{-1}$.

Step 7: The participant node Alice and the participant node Bob input their respective private matrix P and private matrix Ig based on the secure two-party matrix multiplication protocol 2PMP, to perform the third round of secure two-party matrix multiplication. After execution of the 2PMP protocol is completed, the computation result will be randomly split into matrices $U_a, U_b \in R^{n \times n}$ according to the random obfuscation technique, which are sent to the participant node Alice and the participant node Bob respectively. Moreover, the two private output matrices satisfy $U_a + U_b = Q \times T^{-1} \times P$.

Step 8: The participant node Alice and the participant node Bob send their final obfuscated private result matrices $U^a$ and $U^b$ to a party requesting the secure two-party matrix inversion computation (i.e., the client), and the client then aggregates the matrices to obtain a final inversion result $(A+B)^{-1} = U^a + U^b$. Based on this, it can be readily verified that:

$$U_a + U_b = Q \times T^{-1} \times P =$$

$$Q \times Q^{-1}(V_a + V_b)^{-1} P^{-1} \times P = Q \times Q^{-1}(V_{a1} + V_{a2} + V_{b1} + V_{b2})^{-1} P^{-1} \times P =$$

$$Q \times Q^{-1}(PAQ + PBQ)^{-1} P^{-1} \times P = (A + B)^{-1}.$$

Based on the descriptions of Embodiment 1 and Embodiment 2, during security analysis, the protocol assumes computation is performed by semi-honest participant nodes, and the secure two-party matrix inversion protocol only involves two parties in the computation. Therefore, collusion between the two parties is not considered. According to the definition of security in the information theory, if the security of each step of the computation process is guaranteed, it is assumed that the entire protocol is secure in terms of computation results. Therefore, the computation security of the end-to-end efficient privacy-preserving method for secure two-party matrix inversion provided by the present disclosure can be explained based on cases where the private invertible matrices P, Q belong to the same party or different parties.

When the private invertible matrices P, Q belong to the same party, in Step 1 of Embodiment 1, the random invertible matrices P, Q are generated locally by the participant node Bob, making the process absolutely secure. In Step 2 and Step 3, the participant node Alice and participant node Bob strictly follow the computation process under the secure two-party matrix multiplication protocol 2PMP. The 2PMP protocol has been proven secure and reliable in previous research. Therefore, when there is no collusion between the two participant nodes, there is no risk of leaking their own private matrices, thus strictly ensuring the security of the computation process in Step 2 and Step 3. In Step 4, Step 5, and Step 6, both the participant node Alice and participant node Bob perform computation locally. The matrix $V_b$ sent from the participant node Bob to the participant node Alice includes the original data matrix B mixed within the intermediate computation result polynomial. Therefore, information of the private matrix B of the participant node Bob is not exposed. Hence, the security of the computation process in Step 4, Step 5, and Step 6 can be ensured. In Step 7 and Step 8, the participant node Alice and the participant node Bob jointly execute the secure two-party matrix multiplication protocol 2PMP. Since the 2PMP protocol is secure and reliable, the two participant nodes will not leak their own private matrix information when there is no collusion. Therefore, the process security can also be ensured in Step 7 and Step 8. In Step 9, the private matrix $U_b = V_{b3} \times P + V_{b4}$ is computed locally by the participant node Bob, which ensures the process security.

Due to the lack of interaction between input and output at each step, and the strict adherence to the protocol process during the computation, the security of each step can be ensured, thereby ensuring the security of the result of the entire computation protocol.

When the private invertible matrices P, Q belong to different parties. in Step 1 and Step 2 of Embodiment 2. the random invertible matrices P, Q are locally generated in secret by the participant node Alice and the participant node Bob. Therefore. the process is absolutely secure. In Step 3 and Step 4. the participant node Alice and the participant node Bob jointly execute the secure two-party multiplication protocol 2PMP. The 2PMP protocol has been proven secure and reliable in previous research. Therefore, when there is no collusion between the two participant nodes. there is no risk of leaking their own private matrices. thus strictly ensuring the security of the computation in Step 3 and Step 4. In Step 5. since the private matrix $V_a$ is computed locally in secret by the participant node Alice. the process is secure. In Step 6. the private matrices $V^b$, T, $T^{-1}$ and $I_B$ are computed locally in secret by the participant node Bob. Both the participant node Alice and the participant node Bob only possess one private invertible matrix, either P or Q. Therefore. neither party can infer the original data of the other party based on the intermediate results. This ensures the process security of the step. In Step 7 and Step 8. the participant node Alice and the participant node Bob jointly execute the secure two-party matrix multiplication protocol 2PMP. Since the 2PMP protocol is secure and reliable, both participant nodes will not leak their private matrix information when there is no collusion. This guarantees the security of the computation process in Step 7 and Step 8. Due to the lack of interaction between input and output at each step. and the strict adherence to the protocol process during the computation, the security of each step can be ensured. thereby ensuring the security of the entire computation protocol.

Figure 6:
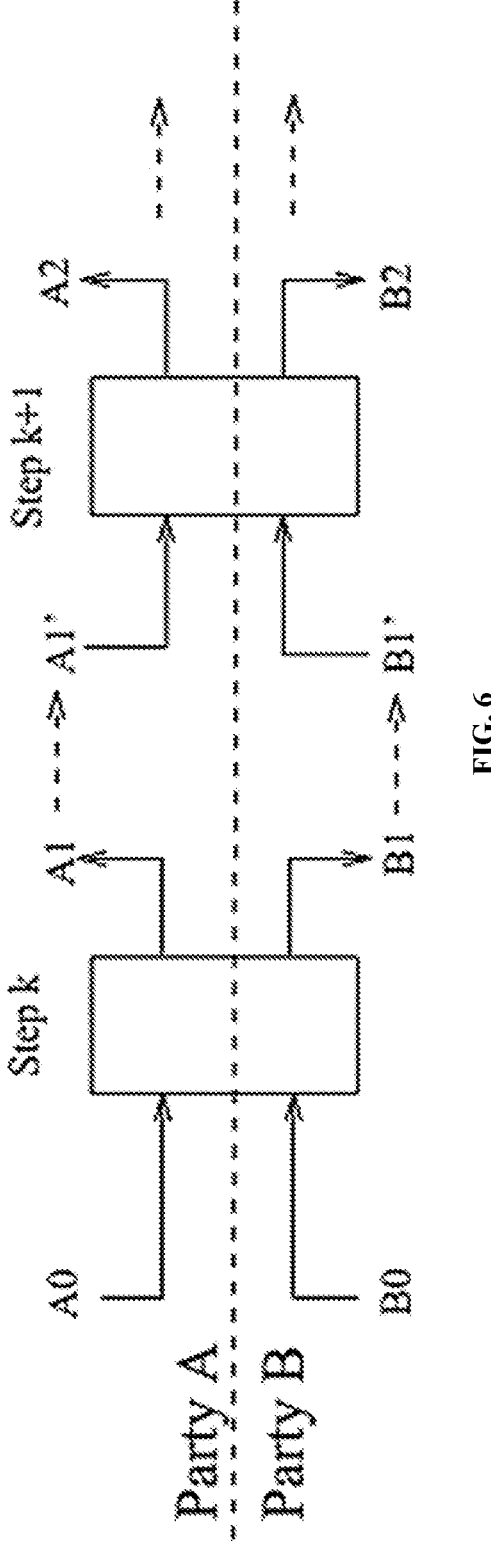
FIG. 6 is a schematic diagram of a data obfuscation encryption technique according to the present disclosure.
Figure 7:
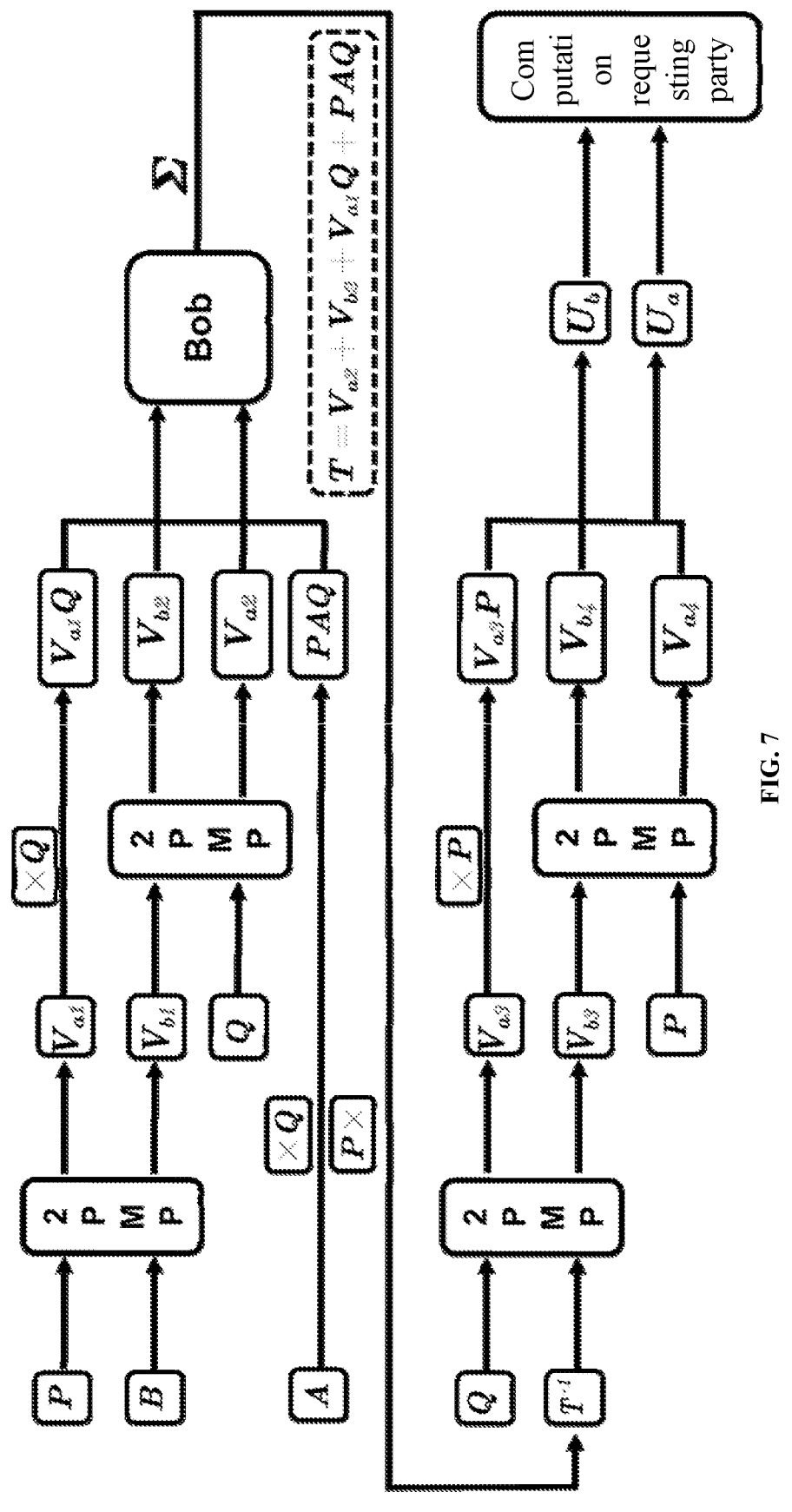
FIG. 7 is a schematic flowchart of a secure two-party matrix inverse computation method based on a 2PMP protocol according to Embodiment 3 of the present disclosure.

Furthermore, based on the above description. in the practical application process. the present disclosure adopts a three-party secure matrix multiplication technique for data obfuscation. Specifically: for most multi-party computations. the process of achieving secure computation typically involves multiple steps. How to ensure safety of intermediate results is an inevitable problem. For example when a product a×b of two-party matrices is used as an intermediate result of the computation. whether the participant node Alice or Bod obtains a result of a final matrix a×b, it is possible to reversely deduce data information of the other party. Therefore, not only safety of an original data input but also safety of an intermediate value should be ensured during a privacy-preserving computation process. In order to solve this problem. the present disclosure proposes a data obfuscation encryption technique. in which an arbitrary multi-item operation is disassembled into a new multi-item addition method for obfuscating and computing a result of an intermediate value. To illustrate its principle more easily. a basic two-party operation type is exemplified herein, and its principle is shown in FIG. 6. It is assumed that $S_k=F_k(A_i, B_i)$, where Fk is a target computation function, $A_i$ is private data belonging to the organization Alice, and $B_i$ is private data belonging to the organization Bob. When each step of a secure multi-party computation protocol is performed, the intermediate result $S_k$ strictly follows the following constraint: Alice only know its own computation result $A_k$, Bob only knows $B_k$, and $A_k+B_k=S_k$. The formula $[A_i;B_i]\Rightarrow[A_k:B_k|A_k+B_k=F_k(A_i, B_i)]$ represents a transfer process of the intermediate value, during which Alice and Bod are not allowed to exchange each other's data information, including $A_k$ and $B_k$ split from the computation intermediate result. Provided that the intermediate value is divided into two pieces of random data items at each step during computation, it is ensured that no one can reversely deduce an original data item from the obfuscated and encrypted data, so that the whole process of privacy-preserving computation is highly secure. In FIG. 7, Step k represents the k-th step of computation.

Embodiment 3

This embodiment provides an alternative solution to Embodiment 1. Embodiment 1 is designed based on the case where the private reversible matrices P, Q E $R^{n×n}$ belong to the same participant node Bob. Therefore, Embodiment 3 is designed based on the case where the private matrices P and Q both belong to the participant node Alice. It is known that the participant node Alice holds a private matrix $A\in R^{n×n}$, and the participant node Bob holds a private matrix $B\in R^{n×n}$ As shown in FIG. 7, the specific process of the solution is as follows:

Step 1: The participant node Alice locally generates two random invertible matrices P, $Q\in R^{n×n}$ in secret.

Step 2: The participant node Alice and the participant node Bob input their respective private matrix P and private matrix B based on the secure two-party matrix multiplication protocol 2PMP, to perform the first round of secure two-party matrix multiplication. After execution of the 2PMP protocol is completed, the computation result will be randomly split into matrices $V_{a1}$, $V_{b1}\in R^{n×n}$ according to the random obfuscation technique, which are sent to the participant node Alice and the participant node Bob respectively. Moreover, the two private output matrices satisfy $V_{a1}+V_{b1}=P×B$.

Step 3: The participant node Alice and the participant node Bob jointly perform the second round of secure two-party matrix multiplication, where an input from the participant node Bob is the private data matrix $V_{b1}$ returned in Step 2, and an input from the participant node Alice is the private data matrix Q. After execution of the 2PMP protocol is completed, the computation result will be randomly split into two private matrices $V_{a2}$, $V_{b2}$ E $R^{n×n}$, which are sent to the participant nodes Alice and Bob respectively. Moreover, the two private matrices satisfy $V_{a2}+V_{b2}=V_{b1}×Q$.

Step 4: The participant node Alice performs local computation in secret to obtain a matrix $V_a=V_{a1}×Q+V_{a2}+P×A×Q$, and then sends the private matrix $V_a$ E $R^{n×n}$ to the participant node Bob.

Step 5: The participant node Bob performs local computation in secret to obtain a matrix $T=V_a+V_{b2}=(V_{a2}+V_{a1}×Q+P×A×Q)+V_{b2}=P(A+B)Q$, where the matrix $T\in R^{n×n}$ Step 6: The participant node Bob further locally calculates an inverse matrix $T^{-1}=Q^{-1}(A+B)^{-1}P^{-1}$ of the matrix T in secret, where $T^{-1}\in R^{n×n}$ Step 7: The participant node Alice and the participant node Bob jointly perform the third round of secure two-party matrix multiplication, where the participant node Alice inputs the matrix Q based on the 2PMP protocol, and the participant node Bob inputs the matrix $T^{-1}$ based on the 2PMP protocol. After execution of the 2PMP protocol is completed, the computation result will be randomly split into two private matrices $V_{a3}$, $V_{b3}\in R^{n×n}$, which are sent to the participant nodes Alice and Bob respectively. Moreover, the two private matrices satisfy $V_{a3}+V_{b3}=Q×T^{-1}$.

Step 8: The participant node Alice and the participant node Bob jointly perform the fourth round of secure two-party matrix multiplication, where an input from the participant node Alice is the private data matrix P returned in Step 7, and an input from the participant node Bob is the private data matrix $V_{b3}$. After execution of the 2PMP protocol is completed, the computation result will be randomly split into two private matrices $V_{a4}$, $V_{b4}\in R^{n×n}$, which are sent to the participant nodes Alice and Bob respectively. Moreover, the two private matrices satisfy $V_{a4}+V_{b4}=V_{b3}×P$.

Step 9: The participant node Bob locally stores the private matrix $V_{b4}$ returned in Step 8 as $U_b$, and the participant node Alice performs secret computation locally to obtain a matrix $U_a=V_{a3}×P+V_{a4}$.

Step 10: The participant node Alice and the participant node Bob send their final obfuscated private result matrices $U_a$ and $U_b$ to a party requesting the secure two-party inversion computation (i.e., the client), and the client then aggregates the matrices to obtain a final inversion result: $(A+B)^{-1}=U_a+U_b$. It can be readily verified that:

$$U_a + U_b = V_{a3} \times P + (V_{b4} + V_{a4}) = V_{a3} \times P + V_{b3} \times P =$$
$$(V_{a3} + V_{b3}) \times P = Q \times T^{-1} \times P = Q \times Q^{-1}(A+B)^{-1}P^{-1} \times P = (A+B)^{-1}.$$

Embodiment 4

Figure 8:
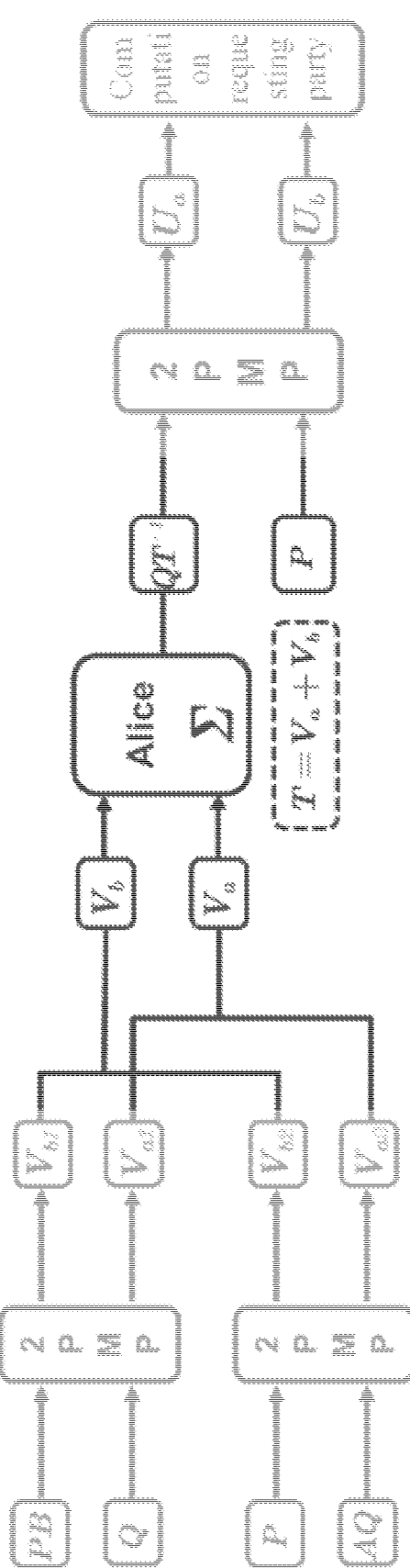
FIG. 8 is a schematic flowchart of a secure two-party matrix inversion computation method based on a 2PMP protocol according to Embodiment 4 of the present disclosure.

This embodiment provides an alternative solution to Embodiment 2. Embodiment 2 is designed based on the case where the private reversible matrices P, $Q \in R^{n \times n}$ belong to different computation participants. Specifically, the private matrix P belongs to the participant node Alice, and the private matrix Q belongs to the participant matrix Bob. Therefore, this embodiment is designed based on the case where the private matrix P belongs to the participant node Bob, and the private matrix Q belongs to the participant node Alice. It is known that the participant node Alice holds a private matrix $A \in R^{n \times n}$, and the participant node Bob holds a private matrix $B \in R^{n \times n}$ As shown in FIG. 8, the specific process of the solution is as follows:

Step 1: The participant node Alice locally generates a random invertible matrix $Q \in R^{n \times n}$ in secret, and performs local computation in secret to obtain a matrix $I_A=A \times Q$.

Step 2: The participant node Bob locally generates a random invertible matrix $P \in R^{n \times n}$ in secret, and performs local computation in secret to obtain a matrix $I_B=P \times B$.

Step 3: The participant node Alice and the participant node Bob input their respective private matrix Q and private matrix IB based on the secure two-party matrix multiplication protocol 2PMP, to perform the first round of secure two-party matrix multiplication. After execution of the 2PMP protocol is completed, the computation result will be randomly split into matrices $V_{a1}$, $V_{b1} \in R^{n \times n}$ according to the random obfuscation technique, which are sent to the participant node Alice and the participant node Bob respectively. Moreover, the two private output matrices satisfy $V_{a1}+V_{b1}=(PB) \times Q$.

Step 4: The participant node Alice and the participant node Bob input their respective private matrix $I_A$ and private matrix P based on the secure two-party matrix multiplication protocol 2PMP, to perform the second round of secure two-party matrix multiplication. After execution of the 2PMP protocol is completed, the computation result will be randomly split into matrices $V_{a2}$, $V_{b2} \in R^{n \times n}$ according to the random obfuscation technique, which are sent to the participant node Alice and the participant node Bob respectively. Moreover, the two private output matrices satisfy $V_{a2}+V_{b2}=P \times (AQ)$.

Step 5: The participant node Bob performs local computation in secret to obtain a matrix $V_b=V_{b1}+V_{b2}$, and sends the private matrix $V_b \in R^{n \times n}$ to the participant node Alice.

Step 6: The participant node Alice performs local computation in secret to obtain a matrix $V_a=V_{a1}+V_{a2}$, aggregates the local matrix with the private matrix received from the participant node Bob to obtain $T=V_a+V_b$, then performs inversion in secret to obtain a matrix $T^{-1}=Q^{-1}(V_a+V_b)^{-1}P^{-1}$, where $T^{-1} \in R^{n \times n}$, and further performs computation to obtain a private matrix $I_A*=QT^{-1}$.

Step 7: The participant node Alice and the participant node Bob input their respective private matrix $I_A*$ and private matrix P based on the secure two-party matrix multiplication protocol 2PMP, to perform the third round of secure two-party matrix multiplication. After execution of the 2PMP protocol is completed, the computation result will be randomly split into matrices $U_a$, $U_b \in R^{n \times n}$ according to the random obfuscation technique, which are sent to the participant node Alice and the participant node Bob respectively. Moreover, the two private output matrices satisfy $U_a+U_b=Q \times T^{-1} \times P$.

Step 8: The participant node Alice and the participant node Bob send their final obfuscated private result matrices $U_a$ and $U_b$ to a party requesting the secure two-party inversion computation (i.e., the client), and the client then aggregates the matrices to obtain a final inversion result: $(A+B)^{-1}=U_a+U_b$. It can be readily verified that:

$$U_a + U_b = Q \times T^{-1} \times P =$$
$$Q \times Q^{-1}(V_a + V_b)^{-1}P^{-1} \times P = Q \times Q^{-1}(V_{a1} + V_{a2} + V_{b1} + V_{+b2})^{-1}P^{-1} \times P =$$
$$Q \times Q^{-1}(PAQ + PBQ)^{-1}P^{-1} \times P = (A+B)^{-1}.$$

Based on the above description, the end-to-end efficient privacy-preserving computation apparatus and method for secure two-party matrix inversion provided by the present disclosure has the following advantages compared with the prior art:

1. The present disclosure proposes an end-to-end serial computation inversion solution based on a secure two-party multiplication protocol. It can address the issues of large computation and communication overhead in ciphertext space caused by the introduction of homomorphic encryption and oblivious transfer techniques in the prior art, and achieves an efficient and secure two-party matrix inversion computation solution in scenarios where high security is not necessary.

2. The present disclosure proposes an end-to-end parallel computation inversion solution based on a secure two-party multiplication protocol. Building upon the end-to-end serial computation inversion solution based on the secure two-party multiplication protocol, this solution further addresses the privacy security issues caused by the leakage of original data. It enhances the security level of the protocol and provides greater flexibility in dealing with security and privacy risks arising from malicious attacks that may lead to the leakage of critical node data. This achieves an efficient and secure two-party matrix inversion computation solution in scenarios where higher security is required.

3. The present disclosure utilizes the secure two-party multiplication protocol 2PMP, which supports calculations with the highest precision of float 64 and provides verification for result reliability. Therefore, the matrix computation types targeted by the present disclosure are not limited to integers. Compared with obfuscation circuit schemes and homomorphic encryption schemes, which can only handle fixed-length decimals and integers, this solution expands the applicability of secure matrix multiplication to a wider range of scenarios. Additionally, the computation results have a numerical precision comparable to centralized computation, solving the problem of loss of numerical precision in floating-point calculations due to the limitations of fixed-length digits in ciphertext calculations in the prior art.

4. By employing a random obfuscation matrix transformation, the present disclosure addresses the potential data security risks associated with the centralized ciphertext computation approach that relies on third-party cloud services. The transformation splits the intermediate result of each computation to different participant nodes.

5. The present disclosure utilizes a data zero-copy approach to distribute data to different participant nodes. Combined with the secure two-party multiplication protocol 2PMP, it ensures the security of the process-level computation. This approach addresses the data security risks associated with the excessive reliance on third-party cloud services for centralized ciphertext computation in existing outsourcing computation technologies, thereby further reducing the cost of computation services and enhancing security control.

Each embodiment in the description is described in a progressive mode, each embodiment focuses on differences from other embodiments, and references can be made to each other for the same and similar parts between embodiments. Since the system disclosed in an embodiment corresponds to the method disclosed in an embodiment, the description is relatively simple, and for related contents, references can be made to the description of the method.

Particular examples are used herein for illustration of principles and implementation modes of the present disclosure. The descriptions of the above embodiments are merely used for assisting in understanding the method of the present disclosure and its core ideas. In addition, those of ordinary skill in the art can make various modifications in terms of particular implementation modes and the scope of application in accordance with the ideas of the present disclosure. In conclusion, the content of the description shall not be construed as limitations to the present disclosure.

What is claimed is:

1. An end-to-end privacy-preserving computation apparatus for secure two-party matrix inversion, comprising:

a client, a first participant node, and a second participant node, wherein the first participant node and the second participant node are both coupled to the client;

the first participant node and the second participant node comprise private data matrices; and the client is configured to generate a privacy-preserving computation request; the first participant node and the second participant node are configured to determine corresponding output matrices based on the privacy-preserving computation request and the respective private data matrices; and the client obtains an inversion computation result based on the output matrices determined by the first participant node and the second participant node;

wherein both the first participant node and the second participant node are deployed with a distributed computing architecture; and the distributed computing architecture comprises a task acquisition module, a secure computation module, a rule generation module, a consensus computation module, and a data transmission module, wherein the task acquisition module is coupled to both the client and the secure computation module; the secure computation module is coupled to the rule generation module; the rule generation module is coupled to the consensus computation module; the data transmission module is coupled to both the consensus computation module and the client; and the task acquisition module is configured to acquire and parse the privacy-preserving computation request generated by the client: the secure computation module is configured to automatically match a secure computation protocol according to the parsed privacy-preserving computation request from the task acquisition module and synchronize the matched secure computation protocol to the rule generation module; the rule generation module is configured to formulate different asynchronous parallel execution processes according to different subtasks assigned to the first participant node and the second participant node, and communicate with the consensus computation module during execution of each computation instruction in the asynchronous parallel execution process; the consensus computation module is configured to ensure synchronization and result consistency of execution of each computation instruction based on a consensus protocol while the first participant node and the second participant node execute each computation instruction; once output matrices of the first participant node and the second participant node are obtained after the entire asynchronous parallel execution process is completed, the data transmission module is configured to send the respective output matrices of the first participant node and the second participant node to the client.

2. The end-to-end privacy-preserving computation apparatus for secure two-party matrix inversion according to claim 1, wherein the client is configured to send the privacy-preserving computation request to the first participant node and the second participant node through a Hypertext Transfer Protocol (HTTP) communication protocol or a cross-platform open source high performance remote procedure call framework communication protocol.

3. An end-to-end privacy-preserving computation method for secure two-party matrix inversion, applied to the privacy-preserving computation apparatus according to claim 1, wherein the privacy-preserving computation method comprises:

generating a first random matrix pair and a second random matrix pair;

determining a first matrix based on the first random matrix pair and a private data matrix of the first participant node, wherein the first matrix is determined by the first participant node;

determining a second matrix based on the second random matrix pair and a private data matrix of the second participant node, wherein the second matrix is determined by the second participant node;

generating a random matrix and determining a second local matrix based on the random matrix, the first matrix, the private data matrix of the second participant node, and the second random matrix pair, wherein the second local matrix is determined by the second participant node;

determining a first local matrix based on the second local matrix, the first random matrix pair, and the second matrix, wherein the first local matrix is determined by the first participant node; and determining an inversion computation result based on the random matrix and the first local matrix, wherein the inversion computation result is determined by the client.

4. The end-to-end privacy-preserving computation method for secure two-party matrix inversion according to claim 3, wherein the client is configured to send the privacy-preserving computation request to the first participant node and the second participant node through a Hypertext Transfer Protocol (HTTP) communication protocol or a gRPC (which is a cross-platform open source high performance remote procedure call (RPC) framework) communication protocol.

5. The end-to-end efficient privacy-preserving computation method for secure two-party matrix inversion according to claim 4, wherein the first matrix comprises:

$$\hat{A} = A + R_a;$$

wherein $\hat{A}$ is the first matrix, A is the private data matrix of the first participant node, and $R_a$ is one random matrix in the first random matrix pair.

6. The end-to-end privacy-preserving computation method for secure two-party matrix inversion according to claim 4, wherein the second matrix comprises:

$$\hat{B} = B + R_b;$$

wherein $\hat{B}$ is the second matrix, B is the private data matrix of the second participant node, and $R_b$ is one random matrix in the second random matrix pair.

7. The end-to-end privacy-preserving computation method for secure two-party matrix inversion according to claim 3, wherein the first matrix is:

$$\hat{A} = A + R_a;$$

wherein $\hat{A}$ is the first matrix, A is the private data matrix of the first participant node, and $R_a$ is one random matrix in the first random matrix pair.

8. The end-to-end privacy-preserving computation method for secure two-party matrix inversion according to claim 3, wherein the second matrix comprises:

$$\hat{B} = B + R_b;$$

wherein $\hat{B}$ is the second matrix, B is the private data matrix of the second participant node, and $R_b$ is one random matrix in the second random matrix pair.

9. The end-to-end privacy-preserving computation method for secure two-party matrix inversion according to claim 3, wherein the second local matrix comprises:

$$T = \hat{A} \cdot B + (r_b - V_b);$$

wherein T is the second local matrix, $\hat{A}$ is the first matrix, B is the private data matrix of the second participant node, $r_b$ is the other random matrix in the second random matrix pair, and $V_b$ is the random matrix.

10. The end-to-end privacy-preserving computation method for secure two-party matrix inversion according to claim 3, wherein the first local matrix comprises $$V_a = T + r_a - (R_a \cdot \hat{B});$$

wherein $V_a$ is the first local matrix, $R_a$ is one random matrix in the first random matrix pair, $\hat{B}$ is the second matrix, T is the second local matrix, and $r_a$ is the other random matrix in the first random matrix pair.

11. The end-to-end privacy-preserving computation method for secure two-party matrix inversion according to claim 3, wherein the inversion computation result comprises:

$$AB = V_a + V_b;$$

wherein A is the private data matrix of the first participant node, B is the private data matrix of the second participant node, $V_b$ is the random matrix, and $V_a$ is the first local matrix.

\* \* \* \* \*